United States Patent
Harris

(10) Patent No.: US 8,044,530 B2
(45) Date of Patent: Oct. 25, 2011

(54) FLUID-BASED ELECTRICAL GENERATOR

(76) Inventor: Christopher H. Harris, New Orleans, LA (US)

( * ) Notice: Subject to any disclaimer, the term of this patent is extended or adjusted under 35 U.S.C. 154(b) by 441 days.

(21) Appl. No.: 12/318,836

(22) Filed: Jan. 9, 2009

(65) Prior Publication Data

US 2010/0176597 A1    Jul. 15, 2010

(51) Int. Cl.
*F03B 13/00* (2006.01)
(52) U.S. Cl. ............ 290/54; 290/43; 60/398; 60/641.7; 415/3.1
(58) Field of Classification Search .............. 290/54, 290/43; 60/398, 641.7; 415/3.1; 416/111, 416/117, 119, 85
See application file for complete search history.

(56) References Cited

U.S. PATENT DOCUMENTS

| | | | |
|---|---|---|---|
| 606,926 A * | 7/1898 | Horst | 416/197 R |
| 1,361,467 A | 12/1920 | Kincaid | |
| 1,783,669 A | 12/1930 | Oliver | |
| 2,652,690 A | 9/1953 | Labriola et al. | |
| 3,750,001 A | 7/1973 | McCloskey | |
| 3,984,698 A | 10/1976 | Brewer | |
| 4,159,426 A | 6/1979 | Staton | |
| 4,224,527 A * | 9/1980 | Thompson | 290/54 |
| 4,260,902 A | 4/1981 | Crider | |
| 4,345,160 A * | 8/1982 | Smith | 290/52 |
| 4,385,497 A | 5/1983 | Scott | |
| 4,408,127 A | 10/1983 | Santos, Sr. | |
| 4,467,217 A * | 8/1984 | Roussey | 290/54 |
| 4,497,630 A | 2/1985 | Oliver | |
| 4,698,516 A | 10/1987 | Thompson | |
| 4,818,888 A | 4/1989 | Lenoir, III | |
| 4,918,369 A | 4/1990 | Solorow | |
| 5,659,210 A | 8/1997 | Yeany | |
| 5,734,202 A | 3/1998 | Shuler | |
| 6,137,194 A | 10/2000 | Haugseth | |
| 6,764,275 B1 | 7/2004 | Carr | |
| 6,765,308 B1 * | 7/2004 | Kazanjian et al. | 290/54 |
| 6,772,592 B2 | 8/2004 | Gerber et al. | |
| 7,134,877 B2 | 11/2006 | Matumoto et al. | |
| 7,222,487 B1 | 5/2007 | Hinkley | |
| 2007/0222219 A1 * | 9/2007 | Peckham | 290/1 R |
| 2008/0110168 A1 | 5/2008 | Lopez | |

FOREIGN PATENT DOCUMENTS

| | | |
|---|---|---|
| GB | 2090939 A | 7/1982 |
| GB | 2313879 A | 12/1997 |

* cited by examiner

*Primary Examiner* — Quyen Leung
*Assistant Examiner* — Michael Andrews
(74) *Attorney, Agent, or Firm* — Richard C. Litman

(57) ABSTRACT

The fluid-based electrical generator utilizes driven flow of a fluid to power an electrical generator for driving an external electrical device. The generator includes a reservoir having at least one sidewall and a floor. A motor coupled to a rotating shaft is mounted external to the reservoir, and a propeller is secured to the rotating shaft. The propeller is driven by the motor and is positioned within the reservoir for generating fluid flow. A rotating support having at least one vane secured thereto is rotatably secured to the floor of the reservoir, and the rotating support is driven to rotate by the fluid flow. An axle is further provided, with a lower end thereof being secured to the rotating support. The electrical generator is coupled to an upper end of the axle, with rotation of the axle driving the electrical generator to produce electricity for the external device.

16 Claims, 3 Drawing Sheets

FLUID-BASED ELECTRICAL GENERATOR

BACKGROUND OF THE INVENTION

1. Field of the Invention

The present invention relates to power generation. Particularly, the present invention is directed towards a fluid-based electrical generator utilizing driven rotational flow of a fluid, such as water, to power a separate electrical generator for driving an external electrical device.

2. Description of the Related Art

Fossil fuels, such as coal, natural gas and oil, are presently being used in tremendous quantities throughout the world. The supply of such fuels, particularly oil and natural gas, may be depleted within the twenty-first century, while the cost of these fuels has risen several drastically in the last ten years. Coal is more plentiful, and presently less expensive than oil or natural gas, but problems exist with pollutants from the burning thereof. Further, power from nuclear fission is relatively expensive because of the initial outlays for power plant construction and, further, difficulties arise in handling the waste products from this source of power.

Further, the generation of power from solar energy has recently stirred a great deal of interest but, presently, solar power producing units are extremely expensive to install relative to the amount of useful power obtained. Solar power is also less useful in northern climates. Major sources of hydroelectric power have already been tapped in the United States, with only minor sources left for exploitation. Though hydroelectric power plants utilize naturally flowing water, thus not depleting limited resources or producing pollutants, such plants are extremely large and very costly to build. It would be desirable to provide a power generation system utilizing ecologically friendly water flow, but which could also be easily and economically constructed. Thus, a fluid-based electrical generator solving the aforementioned problems is desired.

SUMMARY OF THE INVENTION

The fluid-based electrical generator utilizes driven rotational flow of a fluid, such as water, to power an electrical generator for driving an external electrical device. The fluid-based electrical generator includes a reservoir having at least one sidewall and a floor. The reservoir defines an open interior region adapted for receiving a desired volume of the fluid.

A motor having a rotating shaft is mounted external to the reservoir, and a propeller is coupled to the rotating shaft of the motor. The propeller is driven by the motor and is positioned within the reservoir for generating continuous fluid flow therein. A rotating support having at least one vane secured thereto is rotatably secured to the floor of the reservoir, and the rotating support is driven to rotate by the fluid flow.

An axle, having opposed upper and lower ends, is further provided, with the lower end thereof being secured to an upper surface of the rotating support. Rotation of the axle is driven by rotation of the rotating support. Additionally, the electrical generator is mounted above the reservoir, with the electrical generator being coupled to the upper end of the axle, such that rotation of the axle drives the electrical generator to produce electricity for powering the external device. Preferably, the electrical generator is also coupled to the motor for at least partially powering the motor.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
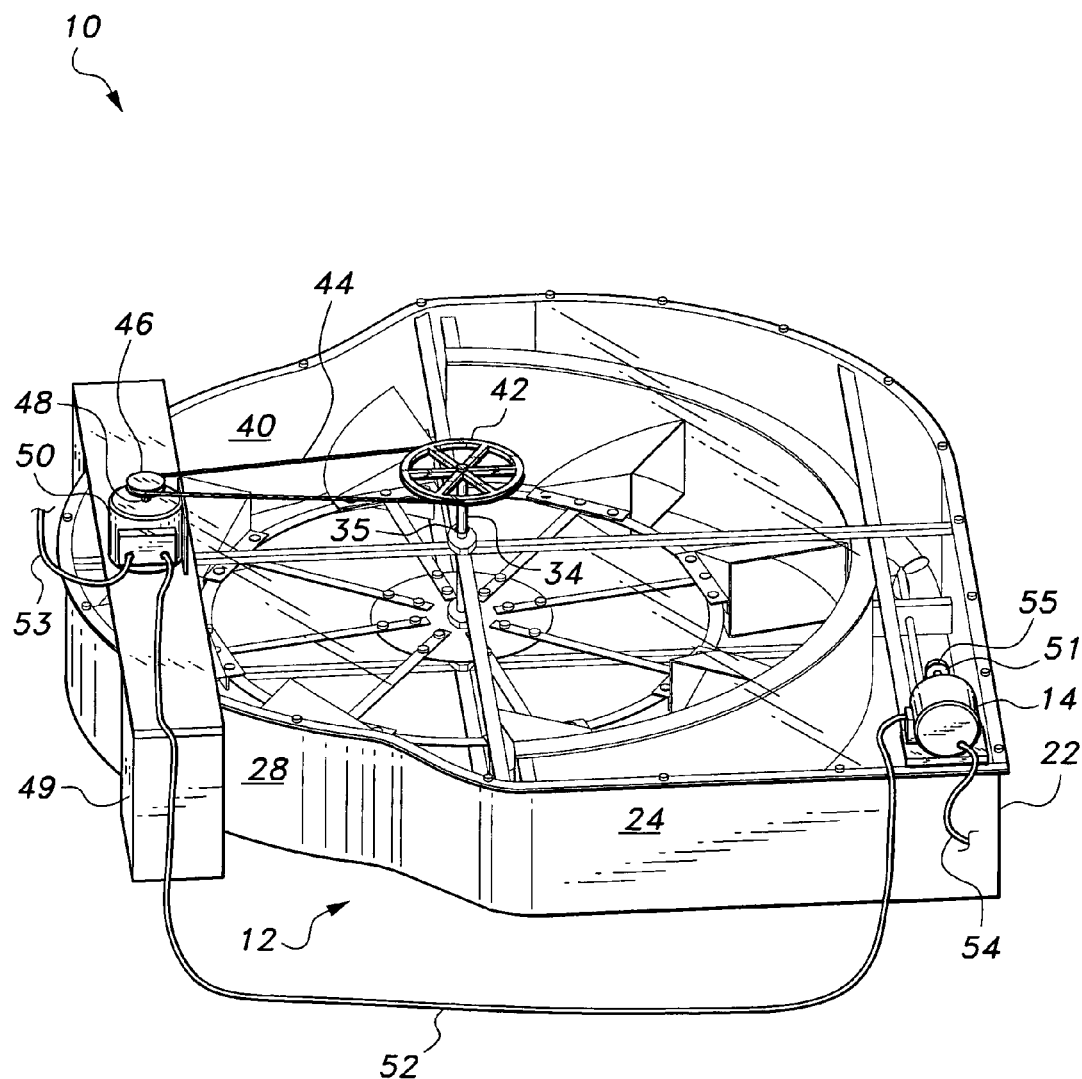
FIG. 1 is a perspective view of a fluid-based electrical generator according to the present invention.

Now referring to FIG. 1, there is a shown a fluid-based electrical generator 10. As will be described in greater detail below, a fluid, such as water, for example, is received within a reservoir 12. A motor 14 propels the water to follow a substantially circular path within the reservoir 12, thus causing rotation of axle 34, which projects through cover 40 of reservoir 12, as shown. The internal drive system for generating fluid flow and causing rotation of axle 34 will be described in detail below, with particular regard to FIG. 2. Rotation of axle 34 causes wheel 42, mounted on an upper end thereof, to rotate which, in turn, causes wheel 46 to rotate, due to pulley belt 44, connecting the pair of wheels 42, 46. Rotation of wheel 46 causes shaft 48 to rotate, powering an electrical generator 50. Power generated by electrical generator 50 is drawn off via line 53 (which may be any conventional electrically conductive cable) for powering an external device. Further, a portion of the power generated by electrical generator 50 is fed to motor 14 via line 52, with motor 14 further being fed from an external power source via line 54. It should be understood that electrical generator 50 may be any suitable type of rotary-driven electrical generator, and motor 14 may be any suitable type of electrically powered motor. As shown in FIG. 1, electrical generator 50 is preferably positioned above the reservoir 12, mounted on a stand 49, positioned about the reservoir 12.

Figure 2:
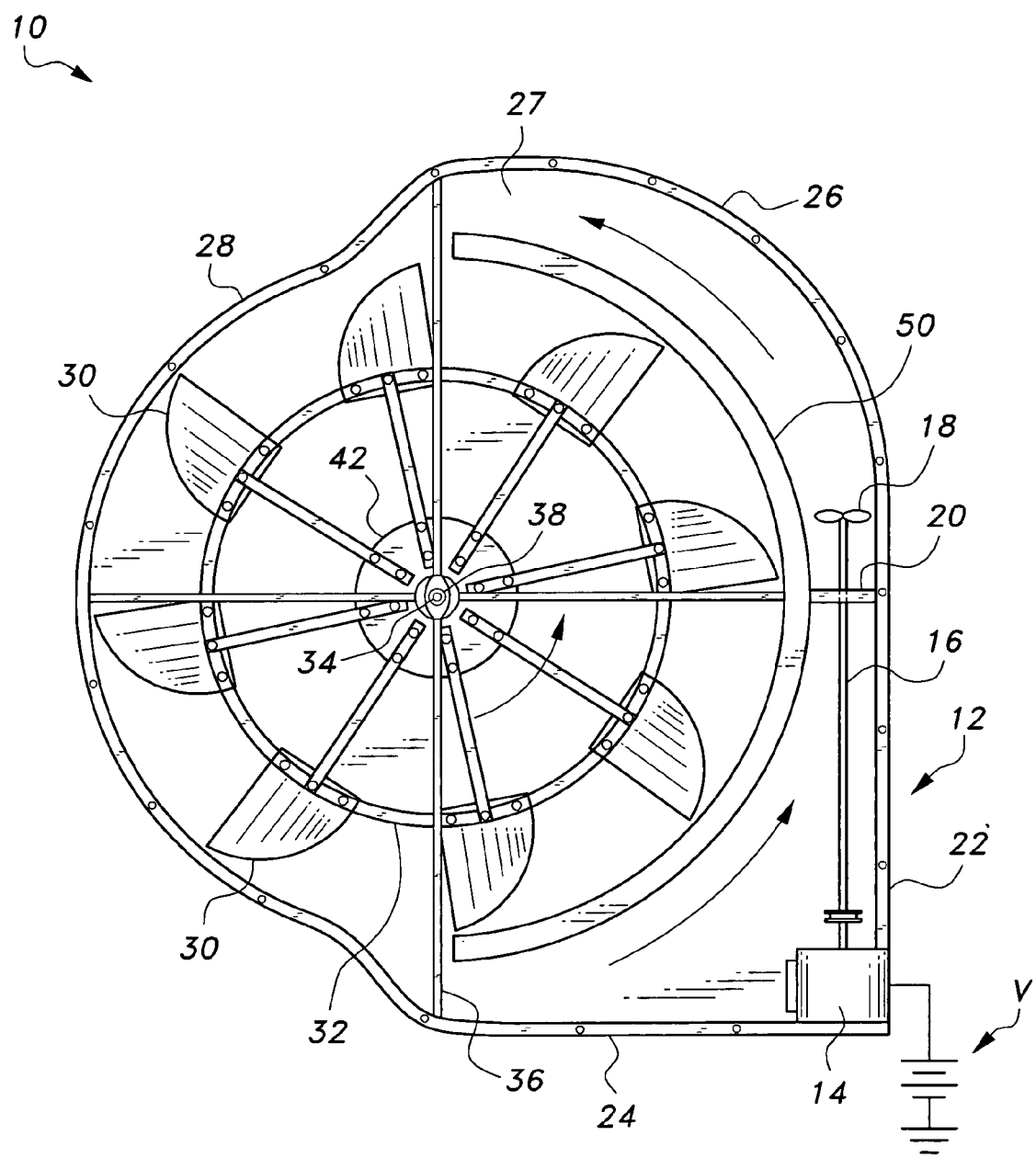
FIG. 2 is a partial plan view of the fluid-based electrical generator according to the present invention.

As best shown in FIG. 2, reservoir 12 includes at least one sidewall. In the preferred embodiment, reservoir 12 is formed from a floor 27, planar sidewalls 22, 24, an arcuate sidewall 26, and a substantially semi-circular sidewall 28. Sidewalls 22, 24, 26 and 28, along with a substantially semi-circular, interior wall 50, define the fluid flow path. Motor 14 is mounted on cover 40, above shaft 16 of propeller 18, and is partially powered by external electrical source V, as described above. Preferably, reservoir 12 has a lateral length (measured from wall 24 to wall 26) of approximately nine feet, and a longitudinal length (measured from wall 28 to wall 22) of approximately eight feet. Each wall has a height of approximately three feet, allowing for approximately 1,800 gallons of water to be received therein. Reservoir 12 may be formed from any suitable, water resistant, non-corrosive material, such as 16-gauge stainless steel, for example. Similarly, cover 40, which is positioned on the upper edge of reservoir 12 (as shown in FIG. 1) may be formed from any suitable, water resistant, non-corrosive material, such as Plexiglas®. It should be understood that reservoir 12 may have any desired contouring or dimensions, dependent upon the desired rotating inertial mass of fluid contained therein.

Motor 14 is coupled to shaft 16 by a pulley belt 55, mounted about wheel 51, or the like, driving shaft 16 to rotate, causing propeller 18 to rotate and drive the water in reservoir 12 along the path indicated by the directional arrows. Shaft 16 may be mounted on or through a support 20 in order to provide stability. As shown, the water follows an arcuate path defined by interior wall 50 and arcuate wall 26 before reaching the flow portion defined by semi-circular wall 28. This driven fluid flow causes rotating support 32 to rotate. Rotating support 32 is rotatably mounted to floor 27 by any suitable type of rotational mounting. A plurality of vanes 30 are secured to the circumference of rotating support 32 (which preferably has a circular contour, as shown), thus driving rotation of rotating support 32.

Figure 3:
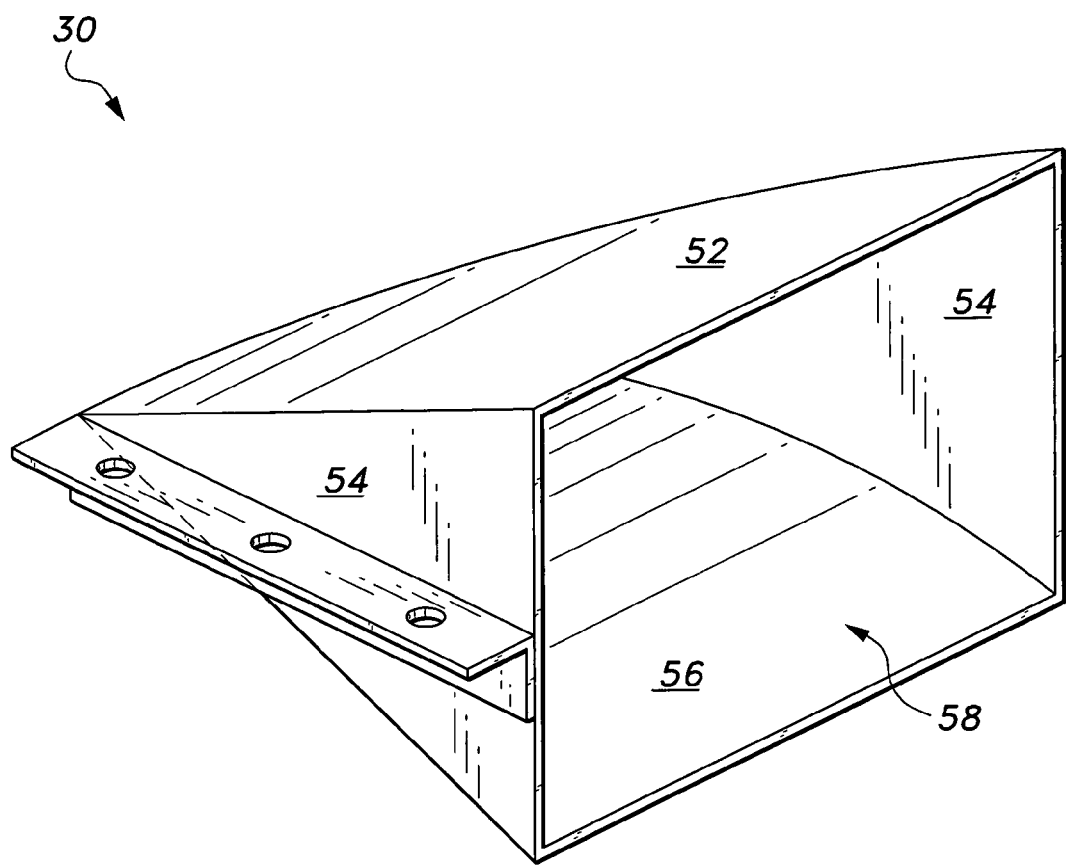
FIG. 3 is a perspective view of a vane of the fluid-based electrical generator according to the present invention.

As shown in FIG. 3, each vane 30 is preferably formed a three-dimensional scoop, defined by a lower wall 56, a pair of sidewalls 54, and an angled upper wall 52. Water flows toward the open mouth of each vane 30, into the open interior 58 thereof, thus driving rotation of the rotating support 32. Vanes 30 may be formed from any suitable, non-corrosive material and may be secured to the circumference of rotating support 32 by any suitable type of attachment.

The lower end of axle 34 is secured to the center of rotating support 32, and rotation of rotating support 32 drives rotation of axle 34. A pair of crossbeams 36 may be mounted on the upper edge of reservoir 12, beneath cover 40, for supporting the axle 34 and maintaining the axle 34 in proper alignment. An opening 38 is formed through the crossbeams 36, at the intersection thereof, and the axle 34 passes through opening 38, along with an opening 35, formed through cover 40.

The driven rotation of axle 34 causes wheel 42, mounted on the upper end thereof, to rotate which, in turn, causes wheel 46 to rotate, due to pulley belt 44, connecting the pair of wheels 42, 46. Wheels 42, 46 may be formed from any suitable material, and it should be understood that pulley belt 44 may be alternatively replaced by any suitable mechanical linkage. Rotation of wheel 46 causes shaft 48 to rotate, powering the electrical generator 50. Power generated by electrical generator 50 is drawn off via line 53 for powering an external device. Further, a portion of the power generated by electrical generator 50 is fed to motor 14 via line 52, with motor 14 further being fed from an external power source via line 54, thus continuing to drive fluid flow within the reservoir 12.

It is to be understood that the present invention is not limited to the embodiments described above, but encompasses any and all embodiments within the scope of the following claims.

I claim:

1. A fluid-based electrical generator, comprising:
    a reservoir having at least one sidewall and a floor, wherein the at least one sidewall comprises a planar wall and an arcuate wall, said reservoir being adapted for receiving a fluid;
    a motor coupled to a rotating shaft;
    a propeller secured to the rotating shaft, said propeller being driven by said motor and being positioned within said reservoir for generating continuous fluid flow therein;
    an interior wall mounted within said reservoir, the propeller being positioned between the interior wall and the planar wall;
    a rotating support having at least one vane secured thereto, the rotating support being rotatably secured to the floor of the reservoir, the rotating support being driven to rotate by the fluid flow;
    an axle having opposed upper and lower ends, the lower end thereof being secured to said rotating support, rotation of said axle being driven by rotation of said rotating support; and
    an electrical generator mounted above said reservoir, said electrical generator being coupled to the upper end of said axle such that rotation of said axle drives said electrical generator to produce electricity for powering an external device.

2. The fluid-based electrical generator as recited in claim 1, wherein said electrical generator is in electrical communication with said motor, said electrical generator partially powering said motor.

3. The fluid-based electrical generator as recited in claim 1, further comprising a cover supported by an upper edge of said reservoir, the cover covering an open upper end of said reservoir.

4. The fluid-based electrical generator as recited in claim 3, wherein said cover has an opening formed therethrough, the axle projecting through the opening.

5. The fluid-based electrical generator as recited in claim 4, further comprising at least one cross-beam mounted within said reservoir adjacent the open upper end thereof, the at least one cross-beam having a central opening formed therethrough, the axle projecting through the central opening.

6. The fluid-based electrical generator as recited in claim 1, further comprising a drive wheel mounted on the upper end of the axle.

7. The fluid-based electrical generator as recited in claim 6, further comprising:
    a generator wheel mounted on a rotating shaft of the electrical generator; and
    a continuous belt linking the drive wheel and the generator wheel.

8. The fluid-based electrical generator as recited in claim 1, wherein the rotating support is positioned between the interior wall and the arcuate wall.

9. The fluid-based electrical generator as recited in claim 1, wherein the at least one vane comprises:
    a lower wall;
    a pair of sidewalls; and
    an angled upper wall, the lower wall, the pair of sidewalls and the angled upper wall defining an open interior region for receiving the fluid.

10. A fluid-based electrical generator, comprising:
    a reservoir having at least one sidewall and a floor, wherein the at least one sidewall comprises a planar wall and an arcuate wall, said reservoir being adapted for receiving a fluid;
    a motor coupled to a rotating shaft;
    a propeller secured to the rotating shaft, said propeller being driven by said motor and being positioned within said reservoir for generating continuous fluid flow therein;
    an interior wall mounted within said reservoir, the propeller being positioned between the interior wall and the planar wall;
    a rotating support having at least one vane secured thereto, the rotating support being rotatably secured to the floor of the reservoir, the rotating support being driven to rotate by the fluid flow;
    an axle having opposed upper and lower ends, the lower end thereof being secured to said rotating support, rotation of said axle being driven by rotation of said rotating support; and
    an electrical generator mounted above said reservoir, said electrical generator being coupled to the upper end of said axle such that rotation of said axle drives said electrical generator to produce electricity for powering an external device, said electrical generator being in electrical communication with said motor for partially powering said motor.

11. The fluid-based electrical generator as recited in claim 10, further comprising a cover supported by an upper edge of said reservoir, the cover covering an open upper end of said reservoir.

12. The fluid-based electrical generator as recited in claim 11, wherein said cover has an opening formed therethrough, the axle projecting through the opening.

13. The fluid-based electrical generator as recited in claim 12, further comprising at least one cross-beam mounted within said reservoir adjacent the open upper end thereof, the at least one cross-beam having a central opening formed therethrough, the axle projecting through the central opening.

14. The fluid-based electrical generator as recited in claim 10, further comprising a drive wheel mounted on the upper end of the axle.

15. The fluid-based electrical generator as recited in claim 14, further comprising:
  a generator wheel mounted on a rotating shaft of the electrical generator; and
  a continuous belt linking the drive wheel and the generator wheel.

16. The fluid-based electrical generator as recited in claim 10, wherein the rotating support is positioned between the interior wall and the arcuate wall.

\* \* \* \* \*